United States Patent [19]
Sherwood et al.

[11] 4,313,853
[45] Feb. 2, 1982

[54] PROCESS FOR FORMING HIGHLY DISPERSED METAL ON GRAPHITE

[75] Inventors: Rexford D. Sherwood, Suffern, N.Y.; Rees T. K. Baker, Murray Hill, N.J.; Eric G. Derouane, Namur, Belgium; Wim J. M. Pieters, Morristown, N.J.

[73] Assignee: Exxon Research & Engineering Co., Florham Park, N.J.

[21] Appl. No.: 215,514

[22] Filed: Dec. 11, 1980

[51] Int. Cl.$^3$ .............................................. B01J 21/18
[52] U.S. Cl. .................................... 252/445; 252/447
[58] Field of Search .............................. 252/445, 447

[56] References Cited

U.S. PATENT DOCUMENTS

| | | | |
|---|---|---|---|
| 4,028,274 | 6/1977 | Kunz | 252/447 |
| 4,055,628 | 10/1977 | McCarroll et al. | 252/447 |
| 4,136,059 | 1/1979 | Jalan et al. | 252/447 |
| 4,140,720 | 2/1979 | Drake | 252/447 |
| 4,160,745 | 7/1979 | Murrell | 252/447 |
| 4,163,775 | 8/1979 | Foster et al. | 252/447 |

*Primary Examiner*—John F. Niebling
*Attorney, Agent, or Firm*—Edward M. Corcoran

[57] ABSTRACT

A process for forming a dispersion of metal selected from the group consisting essentially of Ni, Co, Mo and mixtures thereof on graphite comprising heating a composite of said metal on graphite at a temperature between about 800°–975° C. in an inert, hydrogen-containing atmosphere to form metal-containing channels in the graphite, raising the temperature to at least about 975° C. so that the metal in the channels spreads out and chemically wets the surface of the channels as a film of metal phase, followed by contacting the so-formed metal-wetted, channeled composite with an oxidizing atmosphere to break up the film of metal phase into discrete metal particles. The average diameter of the particles is generally below about 25 Å and the preferred metal is nickel.

14 Claims, 3 Drawing Figures

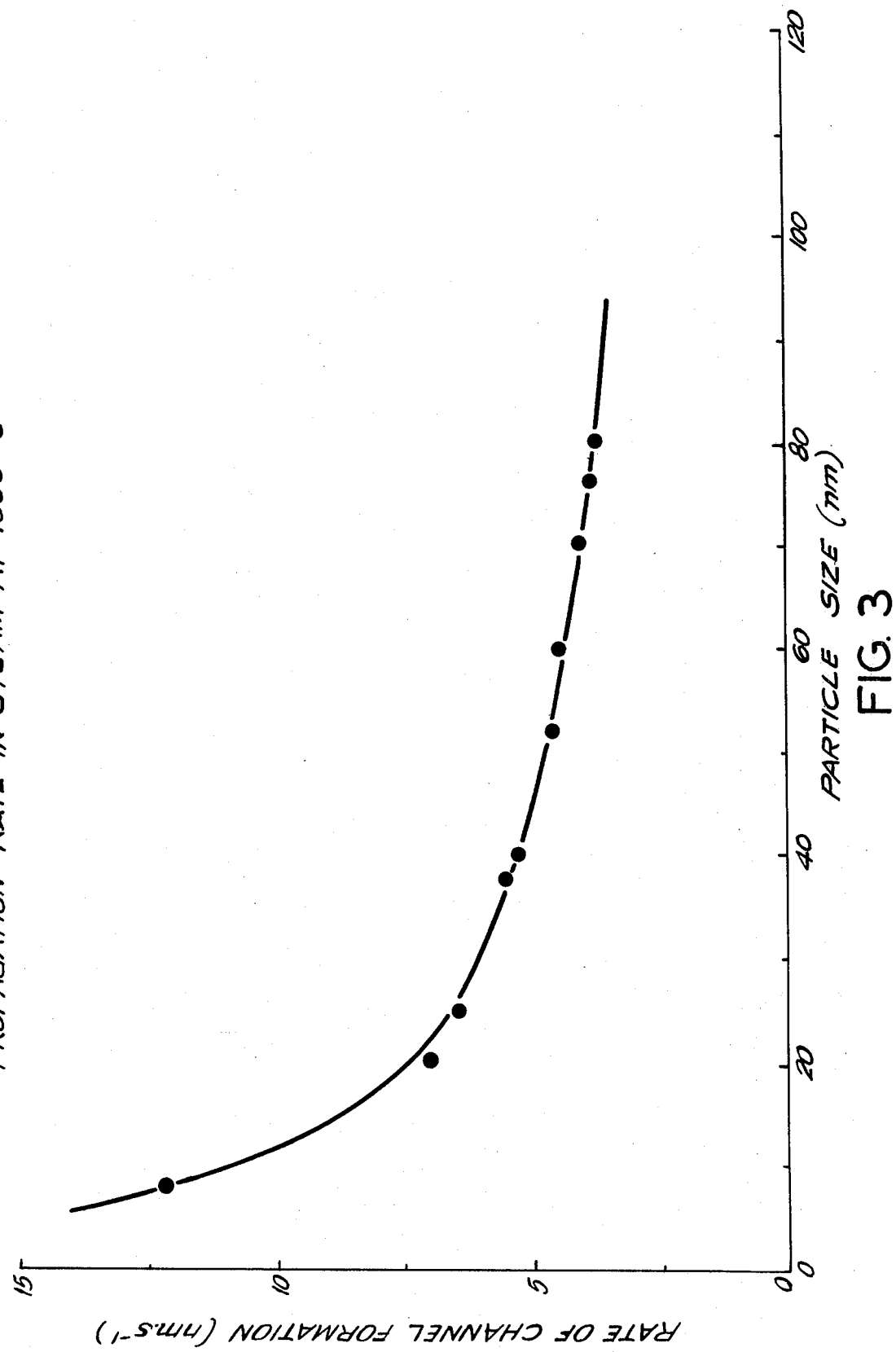

PROCESS FOR FORMING HIGHLY DISPERSED METAL ON GRAPHITE

BACKGROUND OF THE INVENTION

1. Field of the Invention

This invention relates to a process for dispersing metal particles on graphite. More particularly, this invention relates to forming highly dispersed particles of metal selected from a group consisting essentially of Ni, Co, Mo and mixtures thereof on a graphite support by heating a composite of said metal on graphite to form metal-containing channels in the graphite, raising the temperature so that the metal in the channels chemically wets the surface thereof as a film of metal phase, followed by introducing an oxidizing atmosphere which breaks up said film into highly dispersed discrete metal particles having an average diameter of less than about 25 Å.

2. Background of the Disclosure

Metals of Groups VIB and VIII of the Periodic Table, such as Ni, Co and Mo, and mixtures thereof deposited on a graphite support are known to be useful for various purposes including hydrogenation catalysts. One of the problems associated with the use of these catalysts is that the metal agglomerates on the surface of the graphite which reduces the surface area of the metal thereby resulting in a loss of catalytic activity. It would be useful and significant improvement in the art if an economical and effective way could be found to redisperse the metal on the graphite support. In the present state of the art the agglomerated metal is recovered by burning the graphite which destroys the catalyst composition. Further, those skilled in the art know that the average particle size of the catalytic metal on a graphite support generally ranges from about 50 Å to 1,000 Å in diameter, with the vast majority of such catalysts having particles whose average diameters range from between about 50 Å to 250 Å. Inasmuch as the catalytic activity of such catalysts is an inverse function of the square of the diameter, smaller metal particles will result in much more catalytically active catalysts. Therefore, it would be a significant improvement to the art if one could achieve catalyst compositions wherein the metal on the graphite support has an average particle size of less than about 50 Å.

SUMMARY OF THE INVENTION

It has now been discovered that one can form highly dispersed particles of metal on graphite via a process which comprises sequentially heating a metal-graphite composite in an inert, hydrogen-containing atmosphere for a time sufficient for the metal to form metal-containing channels in the graphite and to wet the so-formed channels with a film of metal phase of said metal in the channels and then switching the atmosphere to an oxidizing atmosphere which effectively breaks up the film of metal phase in the channels into very small, discrete particles of metal having an average diameter of generally less than about 25 Å. More particularly, this invention relates to a process for forming a dispersion of a metal selected from the group consisting essentially of Ni, Co, Mo and mixtures thereof on a graphite support comprising the sequential steps of (a) heating the metal-graphite composite in an inert, hydrogen-containing atmosphere at a temperature generally ranging from between about 800°–975° C. for a time sufficient for the metal to form a plurality of metal-containing channels in the graphite support, followed by (b) raising the temperature to at least about 975° C. for a time sufficient for the metal in the channels to spread out and chemically wet at least a portion of the surface of said so-formed channels as a thin film of metal phase, followed by (c) contacting the metal-wetted, channeled composite with an oxidizing atmosphere at a temperature of at least about 800° C. to break up the metal film in said channels and form a dispersion of discrete particles of said metal on the graphite support. Preferred metals are Ni and Co. A particularly preferred metal is Ni.

By grapite support is meant any graphite or graphite-containing support. Suitable supports include relatively pure forms of graphite such as graphite single crystals and Grafoil as well as mixtures of graphite with other materials. Illustrative but non-limiting examples of mixtures of graphite with other carbonaceous materials include asphalt, pitch, coke formed as a result of various hydrocarbon conversion reactions in petroleum refineries and petrochemical plants, etc., as well as coke formed on catalysts containing Ni, Co, Mo and mixtures thereof. As is well known to those skilled in the art, crystalline forms of carbon such as graphite have a basal plane or a-face ($<11\bar{2}0>$ direction) and a plane perpendicular to the basal plane or c-face ($<10\bar{1}0>$ direction). In the process of this invention, particles of the metal create channels in the c-face parallel to the a-face by catalytically gasifying the graphite. This increases the surface area of the c-face. It has been found that the metal will channel into the c-face surface and chemically wet the so-formed channels, but will not channel into the a-faces or basal planes.

As has heretofore been stated, metals that have been found to be useful for the composition of matter of this invention are Ni, Co, Mo and mixtures thereof. Nickel and cobalt are preferred and nickel is particularly preferred as the metal. It is understood, of course, that the process of forming the catalyst of this invention may start with a composite of the metal and graphite or graphite-containing material. Illustrative, but non-limiting examples include coke deposited on a metal surface containing one or more of said metals, such as coked steam cracker tubes, coked catalysts, etc. Alternatively, the metal may be added to the graphite or graphite-containing support by any convenient means known to those skilled in the art. Illustrative, but non-limiting examples include evaporating the metal onto the graphite in a vacuum, plasma or flame spraying the metal onto the support and various wet chemistry techniques employing metal precursors such as impregnation, incipient wetness, etc., followed by drying the contacting with a reducing atmosphere at elevated temperature to insure that the deposited metal is in the reduced, metallic form. Reducing the metal may be part of the heating step of the process wherein the composite is heated in a hydrogen atmosphere to form metal-containing channels in the graphite support. Metal precursors may be initially present on the graphite in the form of a metal salt or oxide such as carbonate, bicarbonate, sulfate, nitrate, etc., the main criterion being that the metal precursor be capable of decomposing to or being reduced to the metal at a temperature below about 875° C. and preferably below about 800° C.

The metal-graphite composite must be heated in an inert, hydrogen-containing atmosphere at a temperature within the range of from about 800°–975° C. for a time sufficient for the metal to form a plurality of metal-containing channels in the graphite. By inert, hydrogen-containing atmosphere is meant an atmosphere that is net reducing to the metal or graphite and which will not adversely affect either the graphite support, the metal, or the gasification reaction. Enough hydrogen must be present to catalytically gasify and channel the graphite. The hydrogen may be initially present therein or it may be formed, in-situ by using a mixture of, for example, steam and ethane and other mixtures of steam and saturated hydrocarbons such as paraffins and saturated cyclic hydrocarbons. The temperature range for channeling is critical inasmuch as channels will not be formed at temperatures below about 800° C. At temperatures above about 975° C., in an inert, hydrogen-containing atmosphere, the metal will spread out and chemically wet the channels as a thin film at which point catalytic gasification and channeling cease. Channeling temperatures of from about 800°–975° C. are preferred and particularly preferred are temperatures within the range of from about 800°–925° C.

When the metal channels into the c-face of the graphite, it does so by catalytically gasifying the carbon with hydrogen to form a gas such as methane. FIG. 1 schematically illustrates gasification and channeling of the graphite by a globule of nickel of about 500 Å in diameter. In a preferred embodiment of the invention, the metal-graphite composite will be heated within this temperature range in an inert, hydrogen-containing atmosphere for a time sufficient to achieve from about 5–20 wt. % gasification of the graphite support. Unless catalytic gasification of the graphite or graphite-amorphous carbon mixture is the desired result it is preferred that the total catalytic gasification of the graphite due to the channeling not exceed about 25 wt. % of the graphite. In practice, it has been found that the gasification rate of the graphite is roughly proportional to the concentration of metal thereon up to about 5 wt. % metal. As the amount of metal on the graphite exceeds about 5 wt. %, the gasification rate approaches a constant value.

After channeling of the graphite support has proceeded to the desired level, as evidenced by the amount of gasification of the graphite, the temperature is raised above about 975° C. at which point the metal in the channels spreads out and chemically wets the surface of the so-formed channels as a film of metal phase and catalytic gasification ceases. By chemical wetting it is meant that the metal wets and chemically bonds to the surface of the channels in the graphite. While not wishing to be held to any particular theory, it is believed that the metal chemically wets the channels as a film approximately one monolayer thick. The metal film exhibits strong interaction with the graphite support and is in itself a unique composition of matter inasmuch as it does not exhibit the properties of the bulk metal. Thus, the term "metal phase" refers to this unique film. In order for this metal-wetting to occur, it is important that the metal-graphite composite be in contact with an inert, hydrogen-containing atmosphere. This atmosphere must be net reducing with respect to both the metal and graphite support. A preferred temperature range for the wetting and metal phase film forming step will range from about 975° to 1150° C., the upper limit being governed by noncatalytic gasification of the graphite which begins to occur at about 1200° C. in the presence of hydrogen. However, if necessary, one can exceed the upper limit of 1150° C. without adversely effecting the metal wetted surface of the composite. One merely loses more graphite support.

In the final step of the process, the metal-wetted, channeled composite is contacted with an oxidizing atmosphere at a temperature of at least about 800° C. which breaks up the metal phase film in the channels into a highly dispersed form of metal which exists as discrete particles having an average diameter of less than 25 Å. Although the average diameter of the metal particles will be below about 25 Å when the metal film initially breaks up, continued exposure of the dispersed-metal/graphite composite will cause these metal particles to agglomerate and grow in size. If desired, particle sizes of 500 Å or more in diameter can be achieved. This thus provides a novel and convenient way of achieving a wide range of average particle size of the dispersed metals. The oxidizing atmosphere may be oxidizing to either the metal, the graphite or both. It is understood, of course, that contacting the metal film/graphite composite with a metal oxidizing atmosphere will result in at least a portion of the dispersed metal (i.e., at least a portion of the surface thereof) particles being in the oxide form which can then be reduced back to the metal by contact with a reducing atmosphere at a temperature below about 975° C. This results in a much more active catalyst because of the greater metal area compared to conventional dispersions of metals, such as nickel on graphite, wherein the average particle diameter ranges from between about 50–1,000 Å and, more generally, between from about 100 to 250 Å. Illustrative, but nonlimiting examples of suitable oxidizing atmosphere includes steam, carbon dioxide, nitric oxide, oxygen, air, etc.

BRIEF DESCRIPTION OF THE DRAWINGS

FIG. 3 is a plot of experimental data showing the relative rate of graphite gasification in an inert, hydrogen-containing atmosphere as a function of nickel particle diameter at a given total quantity of nickel.

EXAMPLES

Figure 1:
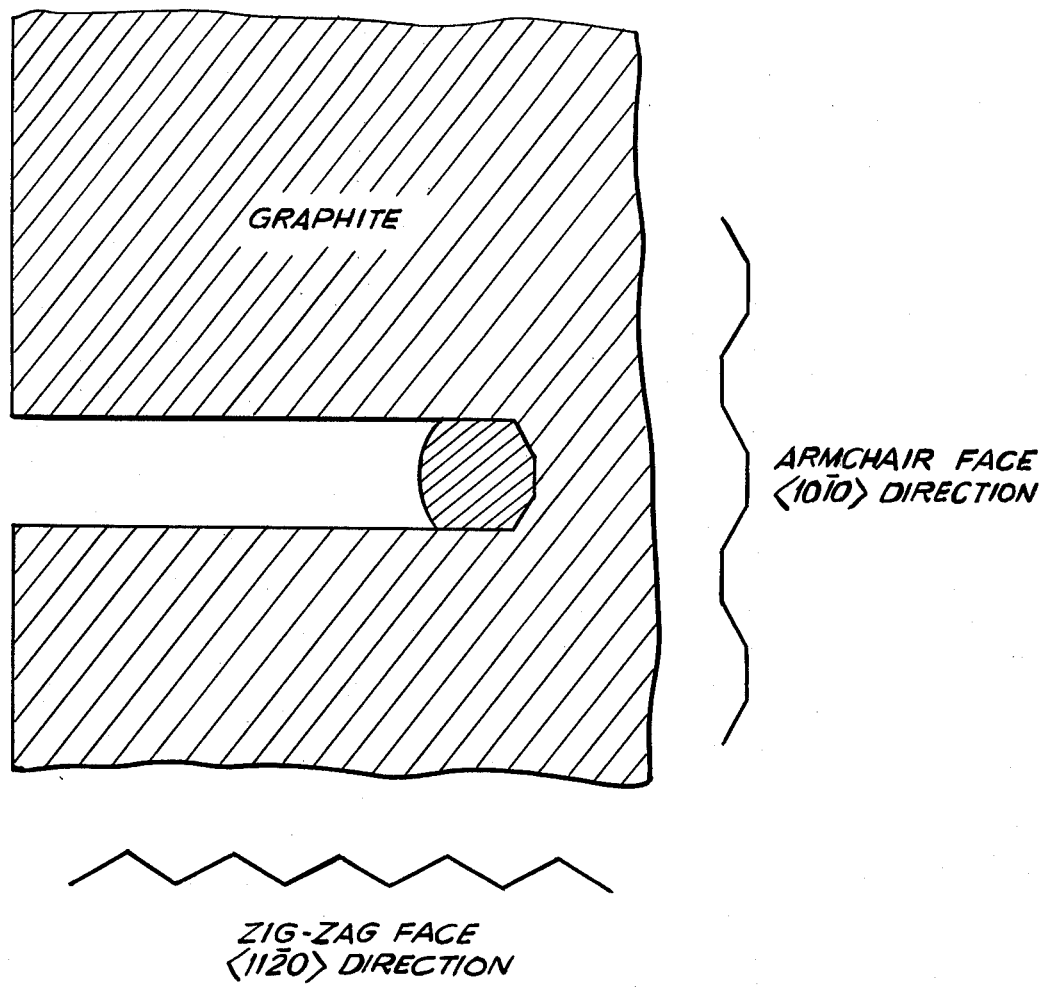
FIG. 1 is a schematic illustration of a globule of metal about 500 Å in diameter channeling into the c-face of graphite.

The invention will be more readily understood by reference to the examples below.

EXAMPLE 1

Spectrographically pure nickel (99.9% pure) was deposited onto transmission specimens of single crystals of graphite (Ticonderoga, N.Y.) as a monolayer film approximately one atom thick by evaporation from a heated tungsten filament at a residual pressure of $5 \times 10^{-6}$ Torr. These nickel-containing specimens were placed in a controlled atmosphere electron microscope (CAEM) for the experimental work. Ethane 99.999% pure (Scientific Gas Products) was bubbled through water at 0° C. to generate a 40/1 ethane/water gas mixture which was then passed through the CAEM at a pressure of 1.0 Torr. As the nickel/graphite specimens were heated in the ethane/steam atmosphere in the CAEM, sporadic nucleation of the evaporated nickel film into small discrete particles was observed at a temperature of about 750° C. Those skilled in the art will know that the ethane/steam mixture formed hydrogen in-situ in the CAEM on contact with the nickel/graphite specimens. As the temperature was gradually raised to 890° C. particle nucleation and growth became more extensive and the first signs of catalytic attack were observed. This action was seen as the creation of very fine straight channels parallel to the a-face ($<11\bar{2}0>$) and perpendicular to the c-face produced by metal particles (50–150 Å diam.) which had collected at edges and steps on the surface. As the temperature was raised both the depth and size of particles propagating channels increased. At any given temperature it was apparent that the largest particles were producing channels at the fastest rates. Catalytic action increased in intensity until the temperature reached about 1000° C., when many of the narrower channels suddenly became devoid of catalyst particles at their head. This behavior became more generalized at 1050° C., extending to include even the larger particles (5,000 Å) and was identical in every respect to that observed for nickel/graphite specimens in a hydrogen atmosphere set forth in Example 4 below. Ultimately the channeling ceased as the nickel particles became completely disseminated. Continued heating up to 1250° C. produced no further catalytic action or restoration of the original particles and only at the highest temperatures were indications of uncatalyzed gasification of graphite apparent. Discrete nickel particle formation was achieved again by treating these inactive specimens in oxygen at 850° C.

EXAMPLE 2

In this example, nickel/graphite specimens produced as in Example 1 were placed in the CAEM in the presence of pure (99.999%) oxygen at a pressure of 5 Torr. Nucleation of nickel particles was essentially complete at about 635° C. As the temperature was slowly raised, there was very little evidence of catalytic gasification. The experiment was concluded at 1150° C. due to vigorous, uncatalyzed gasification of the graphite which often resulted in specimen disintegration.

EXAMPLE 3

This experiment was similar to that in Examples 1 and 2, except that the atmosphere in the CAEM was 40/1 argon/steam at a pressure of 1 Torr. Thus, in this experiment as in that in Example 2, an oxidizing atmosphere was used in the CAEM. The results were similar to those in Example 2 except that catalytic gasification of the carbon ensued at about 935° C. with the nickel particles forming channels in the graphite parallel to the basal plane ($<11\bar{2}0>$). Uncatalyzed attack of the graphite became significant at about 1100° C.

EXAMPLE 4

This experiment was similar to that of Examples 1–3, except that the atmosphere in the CAEM was 1 Torr dry hydrogen (99.999% pure). Nickel particle nucleation commenced at about 755° C. with catalytic attack of the graphite commencing at about 845° C. which was seen as the development of fine channels parallel to the a-face of the graphite surface. As the temperature was raised, both the size and the number of channeling particles increased. The channels were up to 1500 Å in width, had many straight sections interrupted by changes in direction of 60° C. or 120° C., and were oriented parallel to (11$\bar{2}$0) directions. There were also examples of particles possessing hexagonal facets at the graphite-catalyst interface which were orientated parallel to (10$\bar{1}$0) directions.

On continued reaction it became evident that the channeling nickel particles were wetting the channels formed in graphite thereby leaving material on the sides thereof. As a consequence the nickel catalyst particles became smaller giving the channels a tapered appearance and, ultimately when all the catalyst was depleted, channels ceased to develop. The thickness of the nickel film formed on the surfaces of the channels was less than the 25 Å resolution of the CAEM. This wetting phenomenon, which started at 980° C., was essentially complete by the time the temperature had been raised to 1098° C. Continued heating in hydrogen up to 1250° C. produced no further catalytic action or restoration of the original particles and only at the highest temperature was it possible to detect signs of uncatalyzed attack. Subsequent cooling or heating in vacuo produced no change in specimen appearance, indicating that the metal-support interaction was very strong. It was significant that inactive particles remained static on the surface and showed less tendency to lose material during the reaction. If hydrogen was replaced by oxygen and the specimen reheated, then at 850° C. small particles less than about 25 A diameter, started to reform along the edges of the original channels which were in the process of undergoing expansion due to uncatalyzed oxidation. This observation supported the idea that particle shrinkage in hydrogen was due to film formation along channel edges rather than volatilization. Eventually at 1065° C. in oxygen these particles proceeded to cut very fine channels emanating from the edges of the original channels. This behavior paralleled that found for Ni/graphite heated directly in oxygen.

EXAMPLE 5

This experiment was similar to those of Examples 1–4, except that the atmosphere in the CAEM was hydrogen/steam at a 40/1 ratio. The results were similar to those obtained in Example 4, except that channeling occurred at about 780° C. and uncatalyzed attack occurred at about 1150° C.

Thus, in oxidizing environments the major source of carbon gasification was due to uncatalyzed attack by the oxidizing atmosphere (Examples 2–3) whereas in the hydrogen-containing atmosphere, which were net reducing with respect to the nickel (Examples 1, 4 and 5) the carbon gasification was virtually completely catalytic. The most significant aspect of these examples resides in the discovery that, in an inert, hydrogen-containing atmosphere (net-reducing), the nickel spread out and wetted the so-formed channel surfaces and that if the so-formed nickel film was exposed to an oxidizing atmosphere (i.e., $O_2$ or $H_2O$), discrete particles of nickel formed from the film on the channel surfaces and the catalytic gasification process could be repeated if one then switched back to an inert, hydrogen-containing atmosphere. The cycle of channeling, wetting and redispersion of the nickel into discrete particles could be repeated indefinitely until there was virtually no graphite left.

EXAMPLE 6

This experiment was identical to that of Example 1, except that the atmosphere in the CAEM was ethane/hydrogen/steam in a ratio of approximately 38/2/1, respectively. Nickel particle nucleation occurred at about 750° C., but was much crisper than that in Example 1 and channeling occurred at about 845° C. The presence of 5% hydrogen in the ethane/steam mixture of Example 1 resulted in a five-fold increase in the rate of the nickel catalyzed gasification of the graphite.

EXAMPLE 7

This example demonstrates the unusual and unique hydrogen chemisorption properties of the wetted nickel film on the channel surfaces of the graphite. Nickel on Grafoil specimens were prepared using an incipient wetness technique. 5 mm disks of Grafoil were soaked in a solution of nickel acetate in methanol for one-half hour at 80° C. after which the Grafoil disks were dried for eight hours at 120° C. and washed with methanol to remove the excess nickel salt to produce a nickel/Grafoil precursor. The unreduced nickel content of this precursor material was 2.7 wt. percent. This precursor was reduced for two hours at 600° C. in pure hydrogen to produce nickel/Grafoil specimens. Specific details of the subsequent experiments are given in Tables 1-3 which are summarized below.

Following reduction at 600° C., the nickel/Grafoil specimens adsorbed (per gram) 20.080 cc of hydrogen, of which 0.048 cc was reversibly adsorbed, at an equilibrium hydrogen pressure of 0.26 atm. Under the same conditions, but following an additional treatment in hydrogen at 1100° C. for one hour, the nickel/Grafoil did not show any hydrogen chemisorption capacity which indicates a modification in the hydrogen chemisorption properties of nickel in the new state produced by the latter treatment. When this material was steamed at 1000° C. in a $H_2O$:He stream (1:40) for one to two hours; the hydrogen capacity was partially restored as 0.043 cc of hydrogen could be chemisorbed. By further re-reduction at 600° C. for 0.5 hours, the latter value was increased to 0.052 cc of hydrogen per gram of catalyst. It was then concluded that steaming the modified nickel/Grafoil composite restored the original chemisorption properties of the nickel.

This example demonstrates that:
- treatment in hydrogen at 1000°-1100° C. of nickel on graphite (Grafoil) leads to a new chemical state of nickel in which the metal does not show its usual hydrogen chemisorption properties,
- the new chemical state of nickel on graphite (Grafoil) that can be prepared by the above treatment can be broken to regenerate the nickel film as small nickel particles which chemisorb hydrogen.

Additional experiments employing ferromagnetic resonance studies of the nickel/Grafoil specimens supported the hydrogen chemisorption studies and reinforced the conclusions that a film-like nickel phase formed by wetting in the channels and that this phase strongly interacts with the Grafoil support and contains very little dissolved carbon.

EXAMPLE 8

This example demonstrates the great increase in the overall rate of gasification of graphite that is achieved when a large particle of metal is redispersed into a number of smaller particles.

The following example is designated to demonstrate the enhancement in the overall rate of carbon gasification realized when one redisperses a large catalyst particle into numerous smaller components.

The catalytic effect of two particles, (a) 80 Å in diameter and (b) 800 Å in diameter, which gasify carbon by the channeling mode is examined using the following mathematical procedure:

(i) Computation of the Particle Volumes

Figure 2:
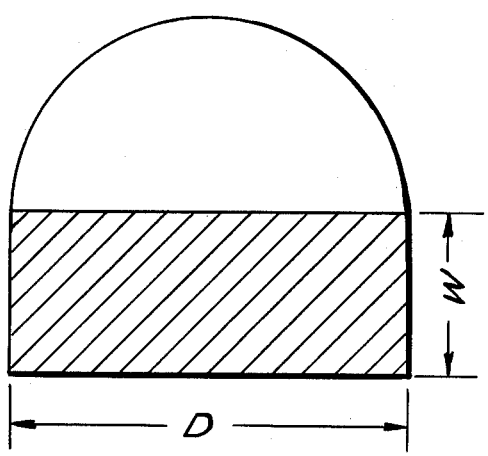
FIG. 2 is a schematic illustration of a globule or particle of channeling metal having the general shape of a hemispherical topped cylinder of diameter D.

During channel formation, electron microscopy has revealed that channeling particles assume a shape which is best approximated by a cylinder of diameter D and height W surmounted by a hemisphere of diameter D, as depicted in FIG. 2. The cylindrical portion of the particle is embedded in the channel, and the hemispherical portion projects from the surface.

The volume of such a particle is given by:

$$V = \pi \frac{D^2}{4} W + \frac{2}{3} \pi \frac{D^3}{8} \quad (1)$$

Experimental evidence obtained from a shadowing procedure indicate that W/D=0.25, which reduces to $$V = \frac{7}{48} \pi D^3 \quad (2)$$

For a particle where D=8 nm, $V = 2.35 \times 10^2$ nm$^3$ and where D=80 nm, $V = 2.35 \times 10^5$ nm$^3$. We can therefore generate 1000 particles (D=8 nm) from 1 particle (D=80 nm).

(ii) Calculation of Amount of Carbon Gasified as a Function of Catalyst Particle Size The number of moles of carbon gasified per second, dn/dt, is given by $$\frac{dn}{dt} = \frac{lDW\rho}{M} \quad (3)$$

where
- l is the rate of channel propagation
- D is the particle diameter
- W is the depth of the channel
- p is the density of graphite, 2.25 g cm$^{-2}$
- M is the atomic weight of carbon, 12

The experimentally determined relationship between rate of channel propagation and nickel particle size for gasification of carbon in steam at 1000° C. is given in FIG. 3 from nickel/graphite specimens prepared following the procedure in Example 1.

This data was obtained from direct observation of the catalytic reaction using controlled atmosphere electron microscopy. The changes in appearance of the specimen are continuously recorded on video-tape and this information is subsequently transferred to 16 mm cine film. Detailed kinetic analysis is performed from frame by frame projection of the movie. In this particular case one measures the linear increase in channel length as a function of time; from such measurements it is a simple operation to calculate the rate of reaction of a given sized particle. Since the depths of channels vary from particle to particle, comparisons such as that given in FIG. 3 are made from particles channeling at a similar depth to each other. This aspect is determined from the difference in contrast in the image between the channel and the surrounding unattacked graphite. Thus the only variables in the measurements plotted in FIG. 3 are the particle sizes and the linear propagation rate of the channels.

From this data we find that the rate of channels propagated by 80 nm diameter particles is 3.75 nm s$^{-1}$, and that by 8 nm diameter particles is 12.2 nm s$^{-1}$. Assuming that W is D/4, we can calculate the number of moles of carbon gasified per sec by each of these particles by substitution of the numerical values into equation 3. For 80 nm diam. particles, $dn/dt = 1.125 \times 10^{-18}$ moles s$^{-1}$ and for 8 nm diam. particles, $dn/dt = 3.66 \times 10^{-20}$ moles s$^{-1}$. However, as shown previously one 80 nm diam. particle can create 1000, 8 nm diam. particles, and in this case the total number of moles of carbon gasified per second would be $3.66 \times 10^{-17}$ moles s$^{-1}$, i.e. this would result in a net increase in carbon gasification rate of 32.5 times that generated by the one larger particle.

TABLE 1

TREATMENTS AND HYDROGEN CHEMISORPTIONS ON NICKEL/GRAPHOIL

| Temperature | | Temperature (°C.) | Measurements |
|---|---|---|---|
| A | Reduction in H$_2$ | 600 | |
| | Evacuation | 550 | |
| | Evacuation | 25 | |
| | Chemisorption of H$_2$ | 25 | C$_1$, C$_2$ |
| | Treatment in H$_2$ | 1095 | |
| | Evacuation | 550 | |
| | Evacuation | 25 | |
| | Chemisorption of H$_2$ | 25 | C$_3$, C$_4$ |
| | Treatment in H$_2$ | 1000 | |
| | Evacuation | 500 | |
| | Desorption | 1000 | D$_1$ |
| | Evacuation | 950 | |
| | Evacuation | 25 | |
| | Chemisorption of H$_2$ | 25 | C$_5$ |
| | Steaming | 800 | |
| | Purging in He | 300 | |
| | Evauction | 25 | |
| | Chemisorption of H$_2$ | 25 | C$_6$ |
| | Steaming (C) | 1000 | — |
| | Chemisorption of H$_2$ | 25 | C$_7$ |
| B | a + b | — | |
| | Chemisorption of H$_2$ | 25 | C$_3$, |
| | Steaming (C) | 1000 | — |
| | Chemisorption of H$_2$ | 25 | C$_6$, |
| | Treatment in H$_2$ | 600 | |
| | Evacuation | 25 | |
| | Chemisorption of H$_2$ | 25 | C$_8$, |

TABLE 2

CHEMISORPTION OF HYDROGEN ON NICKEL/GRAPHOIL CATALYSTS

| Run | | Treatment$^{(a)}$ | Volume H$_2$ Adsorbed$^{(b)}$ |
|---|---|---|---|
| 1. | C$_1$ | Reduced 600° C., total | 0.080 |
| | C$_2$ | Reduced 600° C., reversible | 0.048 |
| | C$_3$ | Treated 1095° C. in H$_2$, 2 hrs | 0.020 |
| | C$_4$ | Evacuated 25° C., following C$_3$ | 0.023 |
| | C$_5$ | Evacuated 1000° C. | 0.0 |
| | C$_6$ | Steaming 800° C. | 0.0 |
| | C$_7$ | Steaming 1000° C. | 0.042 |
| 2. | C$_3'$ | Reduced 600° C., treated 1000° C. in H$_2$, 1 hr | 0.0 |
| | C$_6'$ | Steamed 100° C., 1 hr | 0.0425 |
| | C$_7'$ | Reduced 600° C. | 0.0525 |

$^{(a)}$See Table 1 for details
$^{(b)}$Value at an equilibrium pressure of 200 Torr. cc H$_2$ STP/gram of catalyst.

TABLE 3

X-RAY DIFFRACTION AND CHEMISORPTION DATA ON TREATED NI/GRAPHOIL SPECIMENS

| Treatment | H$_2$ Chemisorption and X-ray |
|---|---|
| 1. Reduced at 600° C. | Large particles and normal H$_2$ chemisorption |
| 2. Reduced at 600° C., treated in H$_2$ at 1000° C., evacuated at 950° C. followed by steaming at 800° C. | Smaller particles, but poor H$_2$ chemisorption, about zero (see C$_6$-Table 2). |

What is claimed is:

1. A process for dispersing metal agglomerated on graphite wherein said metal is selected from the group consisting essentially of Ni, Co, Mo and mixtures thereof said process comprising the sequential steps of:
   (a) contacting said metal-agglomerated/graphite composite with net-reducing, hydrogen-containing atmosphere at a temperature ranging between about 800°–975° C. for a time sufficient for the metal to form a plurality of metal-containing channels in the graphite;
   (b) contacting said channeled composite formed in (a) with a net-reducing, hydrogen-containing atmosphere at a temperature of at least about 975° C. for a time sufficient for said metal in said channels to spread out and chemically wet at least a portion of the surface of said channels; and
   (c) contacting said metal-wetted, channeled composite formed in (b) with an oxidizing atmosphere at a temperature of at least about 800° C. to form a dispersion of discrete particles of said metal on the surface of said so-formed channels on said graphite.

2. The process of claim 1 wherein said metal forms said channels by catalytically gasifying said graphite with hydrogen.

3. The process of claim 2 wherein the average diameter of said metal particles formed in (c) is below about 100 Å.

4. The process of claim 3 wherein the average diameter of said metal particles formed in (c) is below about 25 Å.

5. The process of either of claims 3 or 4 wherein said metal is selected from the group consisting essentially of Ni, Co and mixtures thereof.

6. The process of claim 5 wherein the amount of metal on said metal graphite composite is between about 5 and 30 wt. % based on the total weight of the composite.

7. The process of claim 6 wherein from about 5 to 20 wt. % of said graphite is gasified with hydrogen during step (a).

8. The process of claim 7 wherein said metal is nickel.

9. The process of claim 8 wherein said graphite is mixed with amorphous carbon.

10. A process for forming a dispersion of a metal selected from the group consisting essentially of Ni, Co, Mo and mixtures thereof on graphite comprising the sequential steps of:
   (a) contacting a composite of said metal and graphite with a net-reducing, hydrogen-containing atmosphere at a temperature ranging between about 800°–975° C. for a time sufficient for the metal to form a plurality of channels in said graphite;
   (b) contacting said channeled composite formed in (a) with a net-reducing, hydrogen-containing atmosphere at a temperature of at least about 975° C. for a time sufficient for the metal in said channels to spread out and chemically wet at least a portion of the surface of said channels; and
   (c) contacting said metal-wetted, channeled composite formed in (b) with an oxidizing atmosphere at a temperature of at least about 800° C. to form a dispersion of discrete particles of said metal on the surface of said so-formed channels on said graphite wherein the average diameter of said particles is less than about 100 Å.

11. The process of claim 10 wherein said graphite is mixed with amorphous carbon.

12. The process of either of claims 10 or 11 wherein said metal is nickel.

13. The process of claim 12 wherein the average diameter of said metal particles is less than about 25 Å.

14. The process of claim 13 wherein the nickel is present on said composite in an amount of from about 5 to 30 wt. % of the total weight thereof.

* * * * *